United States Patent

Saurel et al.

[11] Patent Number: 5,123,418
[45] Date of Patent: Jun. 23, 1992

[54] MICRO-ECHOGRAPHIC PROBE FOR ULTRASOUND COLLIMATION THROUGH A DEFORMABLE SURFACE

[75] Inventors: Jean-Marc Saurel, Clapiers; Jacques Attal, Montferriez/Lez, both of France

[73] Assignee: Centre National de la Recherche Scientifique-C.N.R.S, Paris, France

[21] Appl. No.: 490,823

[22] Filed: Feb. 27, 1990

[30] Foreign Application Priority Data

Feb. 28, 1989 [FR] France ................. 89 02744

[51] Int. Cl.⁵ .............................................. A61B 8/00
[52] U.S. Cl. .................................................. 128/662.03
[58] Field of Search ............... 128/662.03, 662.04, 128/660.01; 73/642, 644; 310/334, 337

[56] References Cited

U.S. PATENT DOCUMENTS

| | | | |
|---|---|---|---|
| 3,379,902 | 4/1968 | Harris et al. | 73/642 X |
| 3,387,604 | 6/1968 | Erikson | 73/642 X |
| 3,934,460 | 1/1976 | Sherwin et al. | 73/642 X |
| 4,084,582 | 4/1978 | Nigam | 128/660.16 |
| 4,184,094 | 1/1980 | Kopel | 128/662.03 |
| 4,193,473 | 3/1980 | Hartemann | 73/642 X |
| 4,281,550 | 8/1981 | Erikson | 73/642 |
| 4,459,852 | 7/1984 | Chubchi et al. | 73/642 X |
| 4,546,771 | 10/1985 | Eggleton et al. | 128/660.01 |
| 4,909,082 | 3/1990 | Khuri-Yakub et al. | 73/642 |

FOREIGN PATENT DOCUMENTS 200159 11/1983 Japan .

OTHER PUBLICATIONS

Patent Abstracts of Japan, vol. 8, No. 48 (P-258) 1485, Mar. 3, 1984.

*Primary Examiner*—Francis Jaworski
*Attorney, Agent, or Firm*—Ladas & Parry

[57] ABSTRACT

The present invention relates to a micro-echographic probe for ultrasound collimation through a deformable surface. The probe comprises at one end an ultrasonic wave beam transducer, disposed, for example, in the form of a spherical cap, so that said beam converges in a focus (A), which focus is also that of the other end of the monolithic body and which is the contact tip, so that the beam which penetrates in the body to be analyzed is collimated. The ultrasonic waves are preferably at a frequency equal to at least 50 MHz.

10 Claims, 2 Drawing Sheets

MICRO-ECHOGRAPHIC PROBE FOR ULTRASOUND COLLIMATION THROUGH A DEFORMABLE SURFACE

FIELD OF THE INVENTION

The present invention relates to a micro-echographic probe for ultrasound collimation through a deformable surface.

The technical sector of the invention is that of the manufacture of probes for echographic apparatus for in-depth analysis and without destruction of objects.

One application of the invention is the micro-echographic analysis of materials with deformable or plastic surfaces, such as tissues or organs close to the skin or accessible by endoscopic route in human beings or higher animals, as well as in insects and in the plant domain.

BACKGROUND OF THE INVENTION

Different types of probes are known. These emit an incident beam of ultrasound towards the material to be analyzed. In order to obtain correct interpretations with good lateral resolution by analysis of the part of the beam that is reflected towards the probe from an internal interface it is necessary to have a convergent or parallel (i.e. collimated) incident beam which is as narrow and powerful as possible and reflection in the material without weakening by parasitic reflections and absorptions.

Instead, it is known that ultrasonic waves are reflected by any intermediate surface and very rapidly absorbed in gases, such as for example in air. These effects increase with the frequency of the waves. On the other hand, they propagate very well in liquid such as water.

In order to respond two to these two imperatives, all heretofore known probes thus comprise, between the emitter and the surface of the material to be analyzed, on the one hand, means generally in the form of lens as in optics, but in that case creating as many intermediate surfaces with parasitic reflection to ensure and monitor the convergence or collimation of the narrowest possible beam from the greatest source and, on the other hand, volumes which are full or filled or sprayed with water or gel ensuring continuity of propagation of the waves.

The two principal domains of application of this echographic equipment are the analysis of objects such as organs and skin in the medical domain, and plants in the agrifoodstuff domain, since, being for the major part composed of water, they lend themselves well to the penetration of the acoustic waves, which are, moreover, painless and a priori inoffensive, and the nondestructive inspection of materials in the mechanical domain, essentially for objects of metallic origin in which the acoustic waves also penetrate well.

Heretofore used probes have been the subject matter of a certain number of Patents: in particular, U.S. patent Ser. Nos. 400 547 and 551, filed on Jul. 21, 1982 and extended to Europe on Mar. 7, 1984 under Publication No. 0 102 179 by TECHNICARE CORPORATION, entitled "Selectable focus ultrasonic transducers for diagnostic imaging" and describing a concave emitter having a double curvature of focussing directly in a buffer transmission liquid. European Patent 0 33 751 is also known, published on Aug. 19, 1981 by HITACHI, entitled "Ultrasonic transducers using ultra high frequency" and claiming a length of the probe equal to a whole fraction 1/N of the Fresnel length. Finally, U.S. Pat. No. 3,934,460 may be mentioned, filed on Aug. 6, 1973 by GENERAL ELECTRIC COMPANY, entitled "Apparatus for focussing and collimating ultrasonic waves" and describing a probe comprising one or more lens, on one side filled with gel or liquid, and on the other side constituted by a material ensuring transmission up to contact with the object.

The majority of existing echographic probes use frequencies of 10 to 15 MHz maximum, which, on the one hand, avoids too great a reflection on the intermediate lens surfaces and parasitic absorptions in case of presence of absorbent space such as air, between the tip of the probe and the surface to be penetrated, as such absorption is a function of the square of the frequency, and, on the other hand, makes it possible to penetrate in the material up to a depth of 4 to 5 cm; a wave of frequency of 5 MHz penetrates for example up to 20 cm.

However, inversely, the resolution in depth is limited by the wave length, which, for low frequencies, does not make it possible to detect possible small defects, whilst the lateral resolution is linked with the width of the beam which, itself, is a function of the qualities of convergence of the probe.

Thus, although presently known equipment can analyze the materials at a depth of several centimeters, with sometimes even adjustments of focussing distance of the beam to improve the detection of echos at different depths, no equipment enables the frequency to be increased in order to effect analysis of the materials at very little depth, some millimeters at the most, beneath their surface with a very good resolution, both in depth and lateral.

The problem raised is that of effecting micro-echographic analyses essentially through deformable surfaces, avoiding the maximum of intermediate surfaces between the acoustic emitter and this surface and concentrating the beam at its end without aberration in order to obtain the most precise possible images of analysis.

SUMMARY OF THE INVENTION

One solution to the problem raised is a micro-echographic probe for ultrasound collimation through a deformable surface, comprising, at one end, an ultrasonic wave beam transducer and, at the other end, a convex tip for contact with said surface, characterized in that said ultrasonic waves are of a frequency equal to at least 20 MHz and in that said transducer is disposed directly on a piece of a preferably isotropic and little-absorbent material, which piece is continuous up to said contact tip, machined directly therein, so that said waves converge directly from said transducer, having any particular arrangement for this towards a focus which merges best with that of said contact tip, determined by the nature of said material, that of said contact surface and the frequency of the waves emitted.

In a particular embodiment, said transducer is in the form of a spherical cap machined directly in said piece made of isotropic material.

In another particular embodiment, said transducer is disposed on a flat surface, machined directly in said piece made of isotropic material, so that it constitutes a lens constituted by regularly spaced concentric rings supplied with signals of different phases.

The result is a novel micro-echographic probe for ultrasound collimation through a deformable surface.

This probe according to the invention offers numerous advantages over those known heretofore, essentially due to the possibility of emitting waves at very high frequencies, up to 1 gigahertz and beyond, if necessary, in that case making it possible to detect, thanks to the high resolution obtained, very small discontinuities immediately below, some millimeters and even less, the surface on which the probe is placed. This probe ensures continuity of the conventional echography, towards the domain of high frequencies, above the 10 MHz generally used.

Furthermore, due to the smaller loss by reflection inside the probe, since the latter has no internal interface, associated with the very narrow collimation of the beam and with the direct contact of the end of the probe against the deformable surface which in that case follows the shape of this end, an excellent acoustic efficiency is obtained, making it possible to conserve the maximum of acoustic energy to penetrate particularly absorbent media, to have images without parasitic background noise and to obtain a better shape recognition.

The probe according to the invention is very simple, does not comprise lenses nor material of different natures separating such lenses. Its monolithic manufacture with one focussing piece and its use are facilitated thereby. Moreover, due to the small depths of penetration, there is no need to adjust the convergence.

According to a particular embodiment, it is also possible, by electronic scanning, to create images of analysis without displacing the probe.

Numerous applications of the invention are possible since they all concern deformable or plastic materials, viz. essentially in the biomedical domain for analysis of tissues and organs near the skin or accessible by the endoscopic route.

Other applications are also very interesting in the agrifoodstuffs domain, such as for example for testing the adherence of the skins of fruit and vegetables on the flesh thereof, such as for tomatoes.

The interest of these probes for testing material whose skin is rubberized, may also be mentioned. These probes may also be used for testing hard materials such as in mechanics, but in that case it is necessary to add a coupling liquid or gel between the tip of the probe and the surface of the material, as is effected up to the present time with other probes and this coupling liquid destroys most of the advantages mentioned hereinabove, attenuates the interest of this probe for this use for which the frequencies of the waves emitted should be reduced, in that case contributing only slight improvements with respect to the heretofore known probes.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
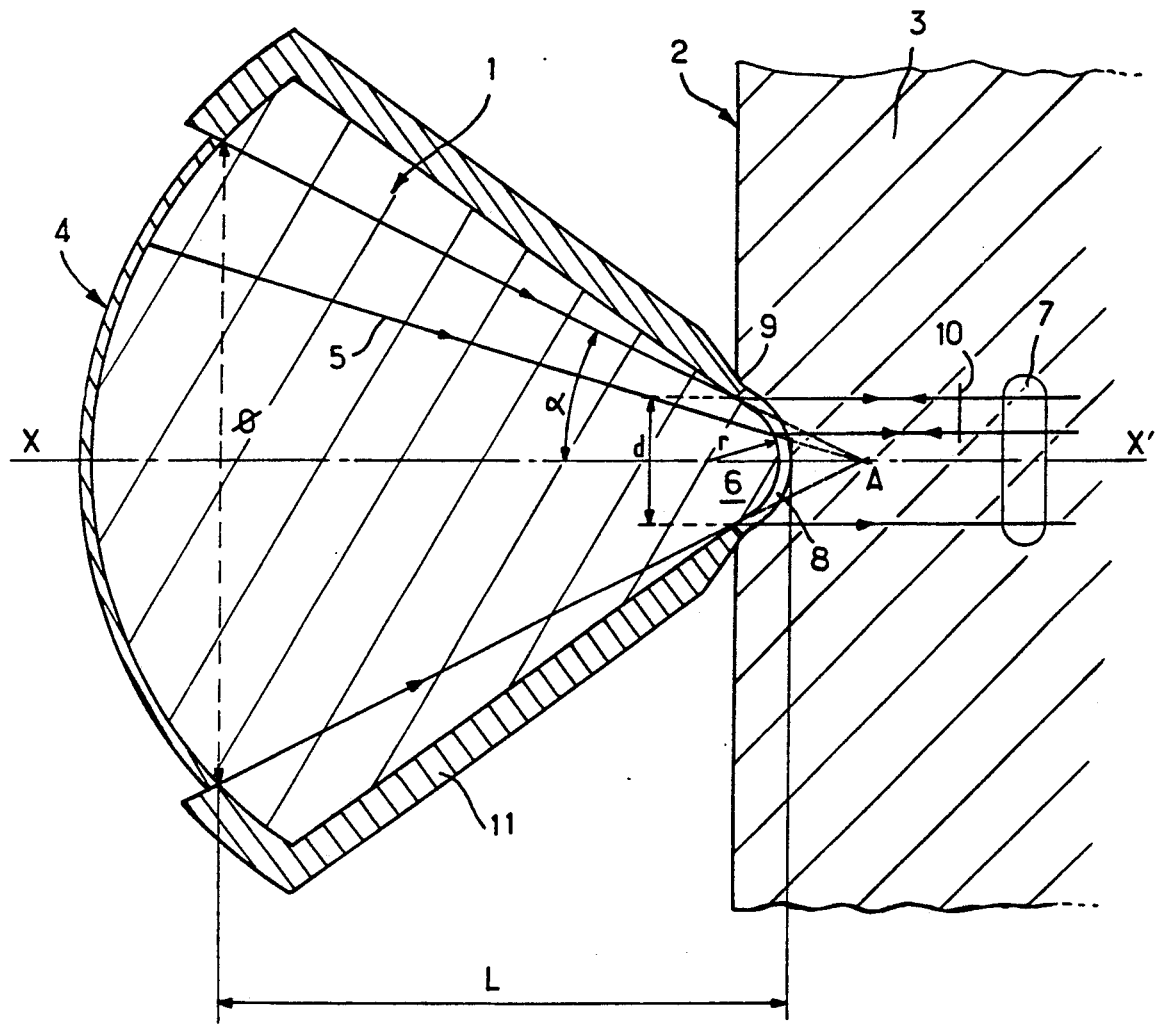
FIG. 1 is a view in longitudinal section of the probe according to the invention with a transducer in the form of a spherical cap.

Referring now to the drawings, FIG. 1 is a view in longitudinal section of the probe according to the invention through any plane passing through its axis XX', the shape of the principal body 1 being of conical type. This probe is shown applied against a deformable surface 2 of a body or any object 3 of which it is desired to analyze the characteristics of the few millimeters located just beneath this surface.

This probe comprises at one end, on the larger base of the cone of the principal body, a transducer 4 of ultrasonic wave beams 5 of any known type and placed directly on said principal body 1, so that the waves 5 penetrate without interface.

This principal body is a single monolithic piece 1 made of a preferably isotropic and little-absorbant material, of the fused silica type.

Figure 3:
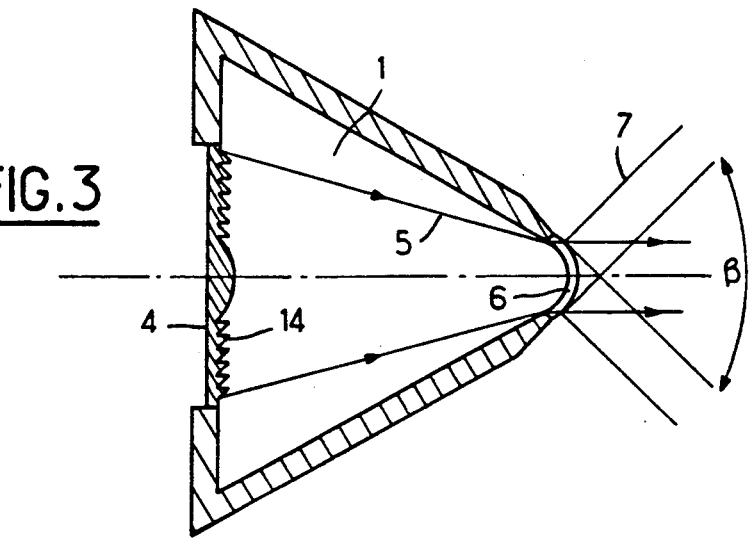
FIG. 3 is a view, partly in section, of a probe with a flat transducer disposed in concentric rings.

Said transducer 4 and the base of the principal body which receives it are disposed so that the waves 5 emitted converge towards a focal point A. In particular, said base may be a spherical cap machined directly in the principal body 1 of centre A, since the transducer 4 being against the material 1, there are no aberrations, but it may equally well be of another shape, as shown in FIG. 3.

The frequency of the waves is at least 20 MHz in order to obtain a good resolution in depth in the object 3, but, in a preferred embodiment, said ultrasonic waves are at a frequency equal to at least 50 MHz.

In order to obtain a good concentration of acoustic energy for a given longitudinal dimension of the probe along axis XX', the angular half sector $\alpha$ of said spherical cap, in a particular embodiment, is about 50°.

The other end of the probe, which is the smaller base of the principal body 1, is a convex tip 6 machined directly in the piece of material constituting this principal body 1, and which is a tip for contact with the deformable surface 2.

This tip 6 is at a distance "L" from the transducer such that the waves 5 are stabilized and coherent, or preferably beyond the distance determining the Fresnel zone, i.e.:

$$L > \frac{\phi^2}{l} \times f$$

where $\phi$ is the diameter of the transducer 4, $l$ the wave length of waves 5 in the material 1 of the probe and f a factor linked with the curvature of the spherical cap of the transducer 4 and which decreases therewith.

The effective aperture d of the contact tip 6 is preferably at the most equal to three times the wave length of said ultrasonic waves 5, in order to improve the lateral resolution of the analysis that said waves allow.

The curvature of contact tip 6 is then determined, and its distance L to the transducer, so that its focus corresponding to the change of medium between the material 1 and the object 3 merges with the focus A of the transducers 4; to that end, the known spherical diopter formulae are used, which give the distance F of this focus with respect to the centre of the curvature of tip 6:

$$F = \frac{r}{1 - \frac{V_2}{V_1}}$$

where r = radius of curvature of tip 6

$v_1$ = speed of transmission of waves 5 in the material of the principal body 1, $v_2$ = speed of transmission of waves 5 in object 3.

Further to the change in medium between the probe and the object, the latter having a lower speed, the diopter of the tip 6 acts as a divergent lens making it possible to obtain a quasi-parallel acoustic beam 7 whose diameter is a function of the aperture d of the tip 6. The closer the diopter of tip 6 is to focus A, the narrower beam 7 is; the volume of the irradiated zone in the object may thus be adjusted as a function of the structures to be disclosed and of the frequency used.

As indicated hereinabove, when aperture d is preferably chosen to be equal to some wave lengths of said ultrasonic waves 5, the determination of the curvature of the tip 6 and of its distance L to the transducer which is deduced therefrom, always gives, as measurements and tests show, a distance "L" greater than the distance of the Fresnel zone.

Similarly, the acoustic beam of the waves 5 emitted by the transducer 4 does not focus exactly at one sole point A, but at a diffraction spot located at focus A and whose diameter is:

$$t \frac{1.22 \times l}{2 \times \sin \alpha}$$

where l is the wave length of the waves 5 in the material 1 of the probe and $\alpha$ the angular half sector of the spherical cap of the transducer 4.

If calculation is made for the particular frequency of 50 MHz, a particular angle $\alpha$ of 50°, and a material 1 made of fused silica, t = about 100μ or the equivalent of the wave length 1 which is then 120μ: it is therefore not necessary to wish to reduce the diameter 7 of the collimated beam by bringing the diopter of tip 6 closer to the focus A. The best that can be obtained is therefore a beam with a diameter approximately equal to the wave length, which gives a transverse resolution equal to that in depth, and this requires machining the diopter of the tip 6 with a diameter only slightly greater than that of the wave length L.

In preferred embodiments, an aperture d is taken, as indicated hereinabove, which is almost and at the most equal to three times this wave length in order not to have too many difficulties in machining this tip 6 and whilst maintaining an advantageous transverse resolution much greater than existing heretofore, thanks to this probe device according to the invention.

As indicated in the preamble, it is known that each interface surface between two different materials reflects a part of the waves which reaches it and therefore weakens the energy of the analysis beam: such reflection is all the greater as the acoustic impedance of the surface is high. This reflection has for value:

$$I = \left( \frac{z2 - z1}{z2 + z1} \right)^2$$

where z1 and z2 are the coefficients of density of each medium = density of the material x by the speed of propagation of the sound in this material.

In our Figure, z2 is that of material of object 3 and z1 that of the material 1 of the probe and the diopter of the tip 6 acts all the more like a mirror as z1 is low with respect to z2: thus, in order to attenuate this reflecting power, the outer surface of the diopter of the contact tip 6 is coated in known manner with a layer 8 of a so-called adaptation material of which the thickness and the quarter wave length 1 of said acoustic waves 5, and of which the impedance z3 is equal to:

$$\sqrt{z1z2}$$

This layer 8, also called non-glare layer, corresponding to a given frequency, may be made of plastic of epoxy film type.

The operator who manoeuvres the probe therefore applies the latter against the surface 2 of the body 3 to be analyzed, so that all the useful part of the diopter of the contact tip 6 possibly covered with this anti-glare layer 8, is in continuous contact with said surface by deformation thereof. There is then complete continuity between the principal body 1 of the probe and the body of the object 3 for passage of the waves 5 which are then collimated in a parallel beam 7 by the diopter of the tip 6 without parasitic attenuation, diffraction and reflection at the edge 9 of the tip 6. This would be the case if the surface were not deformable or if the probe were not sufficiently applied thereagainst. In that case there would be an air space at the corner of thickness varying from the point of contact up to edge 9, all the waves leaving the diopter of tip 6 in this space then being much attenuated, reflected and diffracted in a direction non-parallel to axis XX'; they would therefore be lost for the measurement and would reduce the precision and quality thereof accordingly.

In order to overcome this drawback in the case of risk, if for example the surface is hardly deformable or hard, this possible space may be filled in known manner with gel or any liquid which then acts as continuity and adaptation layer.

The interface created by the diopter of tip 6 despite the precautions and optimum characteristics of the device according to the invention, may return the waves against the lateral walls of the principal body 1: if they are reflected due to their time of passage, they disturb the transducer 4 when the latter receives in return the waves penetrating the object 3 and themselves reflected by the internal surfaces 10 to be analyzed.

In order to avoid this noise, the whole lateral surface of the piece of body 1 is covered between the transducer 4 and the contact tip 6, with an acoustic absorbent material 11. This acoustic absorbent material may have any particular form and may be constituted for example by tungsten-laden epoxy resin.

Figure 2:
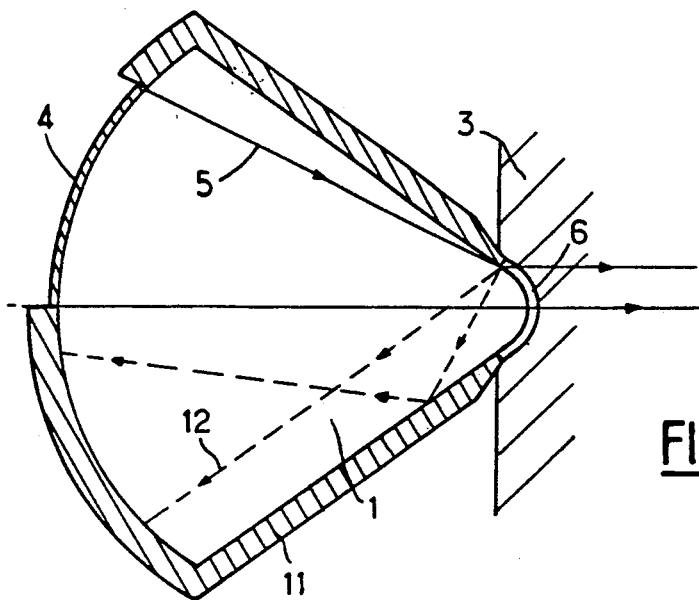
FIG. 2 is another view, partly in section, of a probe with a transducer in the form of half a spherical cap.

FIG. 2 is another view in section of a probe according to the invention in which the transducer 4 covers only a portion and preferably half of the spherical cap of the principal body 1 which, moreover, may have the same characteristics as that described in FIG. 1 with a contact tip 6 applied against the object 3 to be analyzed and an absorbent material 11 covering all the rest of the surface.

The interest of such an arrangement is that the acoustic waves 12 which are then reflected by the diopter of tip 6 are returned only towards that part of the spherical cap of the body 1 which does not support the transducer 4. This arrangement also improves the measurement and possible analysis by actuating the background noise.

FIG. 3 is a view in section of a probe in which the transducer 4 is disposed on the face of the principal body 1, whose surface 14 is flat and comprises regularly spaced concentric rings, in that case supplied with signals of different phases, so that the acoustic waves 5 emitted converge in the same manner as in FIGS. 1 and 2 above.

This is possible when said surface and its rings make a lens of Fresnel or Soret type, which are known in the acoustic domain to have the above properties, in accordance with characteristics as described in document "Ultrasonics Symposium" of 1986, page 745 et seq., written by Messrs. Makoto Minakata and Ken Yamada et al. of the Research Institute of Electrical Communication at the Tohoku University of Sendai, Japan.

It is in fact the phase shift of the signals emitted by each ring which, by annulation of certain waves then in phase opposition, privileges the emission of the waves in phase and therefore amplified in a given direction: furthermore, by monitoring by any known electronic scanning system the phaseshift of the rings 14 which themselves are then divided into sections in order to constitute emitters in matrix or in line, the direction of convergence of the beam of waves 5 may be changed and the collimated beam 7 may then scan in a given angle $\beta$.

Figure 4:
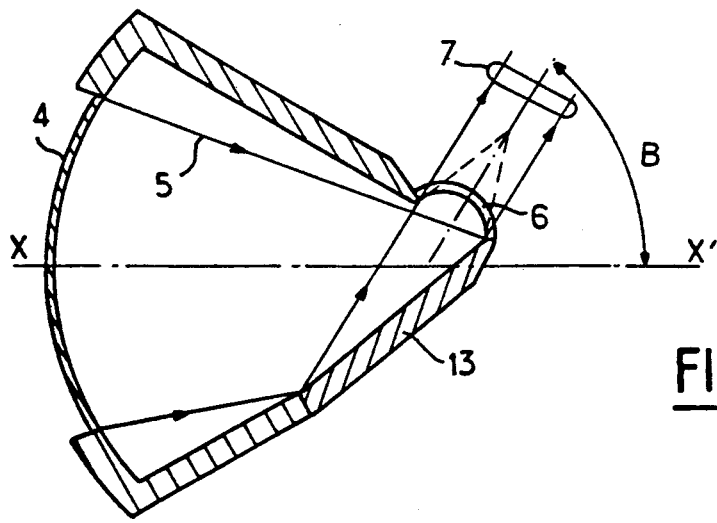
FIG. 4 is a view, partly in section, of a probe with beam deviated by a determined angle.

FIG. 4 is a view in section of a probe of which the piece of the principal body 1 for transmission comprises a flat acoustic reflector 13 disposed so that the acoustic beam 5 is deviated and then passes through the contact tip 6, which contact tip makes a determined angle B with respect to axis XX' of the probe, i.e. of transducer 4.

The collimated beam 7 then makes the same angle B with this axis and enables said probe to be used for making angled analyses, for example as used in dental check-ups.

As described in the different Figures, it is therefore possible, by slight pressure of the tip 6 on the object, possibly wetting the end with water or acoustic gel or any other liquid, if the surface is slightly hard and/or porous or with roughness, to render soundless the object and to recover the different echos coming from the different internal interfaces in this object. An electronic device receives the echos received by the transducer 4 and effects in known manner the separation in time and the reconstitution in distance of these different interfaces, and this all the more easily as the device according to the invention eliminates the parasitic noises.

A priori, there is no limitation in frequency of waves 5, taking into account the virtual nonexistence of coupling liquid, and it is only the intrinsic acoustic absorption in the object 3 to be analyzed and examined which controls maximum penetration of the acoustic waves.

The present invention is not limited to the embodiments described hereinabove which constitute only examples of manufacturing the device according to the invention, and modifications and variants may be made within the scope of the invention.

What is claimed is:

1. In a micro-echographic probe for collimation of ultrasonic waves into a deformable surface of a material, the probe having, at one end, a transducer for providing a beam of said ultrasonic waves and, generally at an opposite end, a convex tip for contact with said surface and defining an opening through which said ultrasonic waves enter said deformable surface and material, the improvement wherein:

said ultrasonic waves have a frequency equal to at least 20 MHz; and said transducer is disposed directly on one end of a principal body that is continuous up to a body tip generally at said convex tip and such that said waves converge in said principal body from said transducer towards a focus in said material.

2. The probe of claim 1, wherein said transducer provides said ultrasonic waves at a frequency equal to at least 50 MHz.

3. The probe of claim 1, wherein a diameter of said opening is at the most equal to three times the wavelength of said ultrasonic waves.

4. The probe of claim 1, wherein all surfaces of said principal body between said one and opposite ends thereof are coated with an acoustic absorbent material.

5. The probe of claim 1, wherein said convex tip comprises a layer of an adaptation material having a thickness of a quarter wavelength of said ultrasonic waves on said body tip.

6. The probe of claim 1, wherein said principal body further comprises a flat acoustic reflector disposed for deviating said ultrasonic waves from said transducer to said convex tip, said convex tip making a determined angle $\beta$ with respect to an axis of the principal body.

7. The probe of claim 1, wherein said one end of said principal body is spherical.

8. The probe of claim 7, wherein the angular half-section $\alpha$ of said spherical one end of said principal body is about 50°.

9. The probe of claim 7, wherein said transducer is disposed only on a half portion of said spherical one end of said principal body.

10. The probe of claim 1, wherein said transducer comprises a lens constituted by regularly space concentric rings for supply with signals of different phases and said one end of said principal body is flat.

* * * * *